No. 801,414. PATENTED OCT. 10, 1905.
F. STEBLER.
AUTOMATIC WEIGHING MACHINE.
APPLICATION FILED JAN. 19, 1903.
2 SHEETS—SHEET 1.
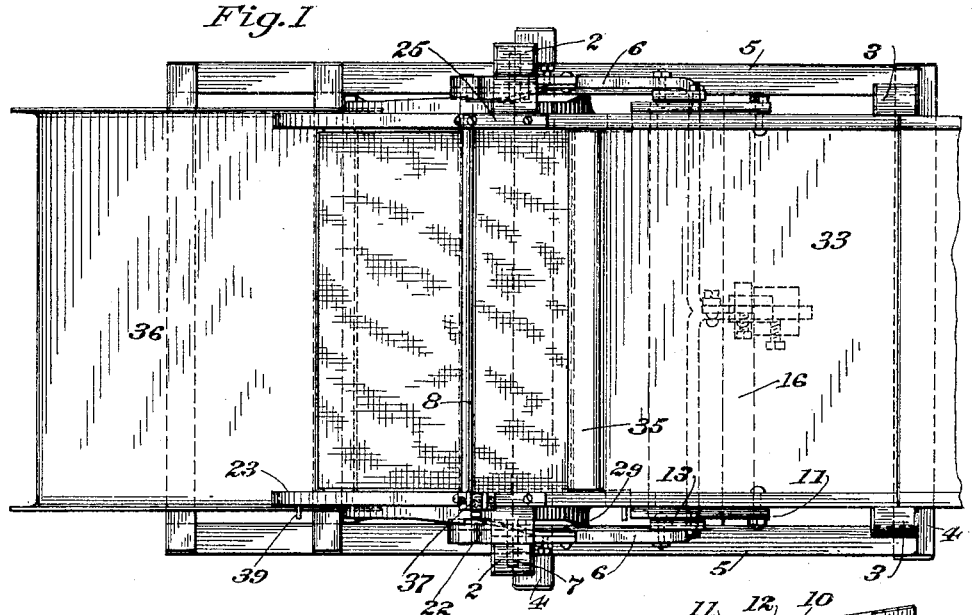
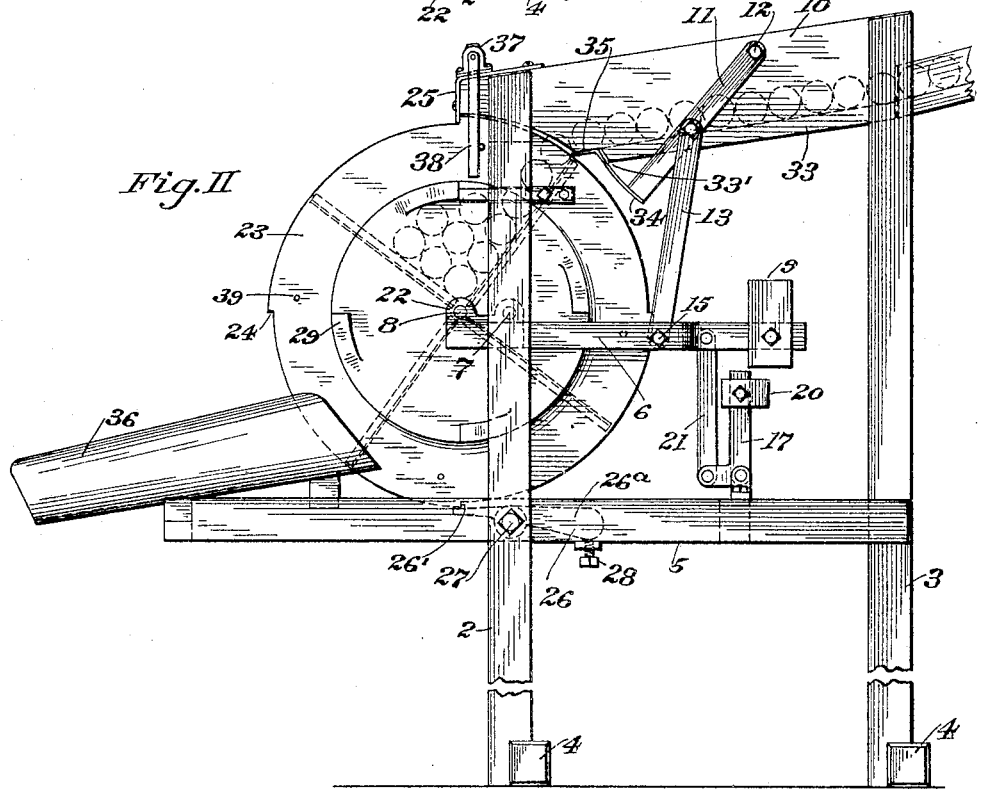
Witnesses
Geo. L. Goetz
Frederick B. Lyon
Inventor
Fred Stebler
by Townsend Bro.
his attys.

No. 801,414. PATENTED OCT. 10, 1905.
F. STEBLER.
AUTOMATIC WEIGHING MACHINE.
APPLICATION FILED JAN. 19, 1903.
2 SHEETS—SHEET 2.
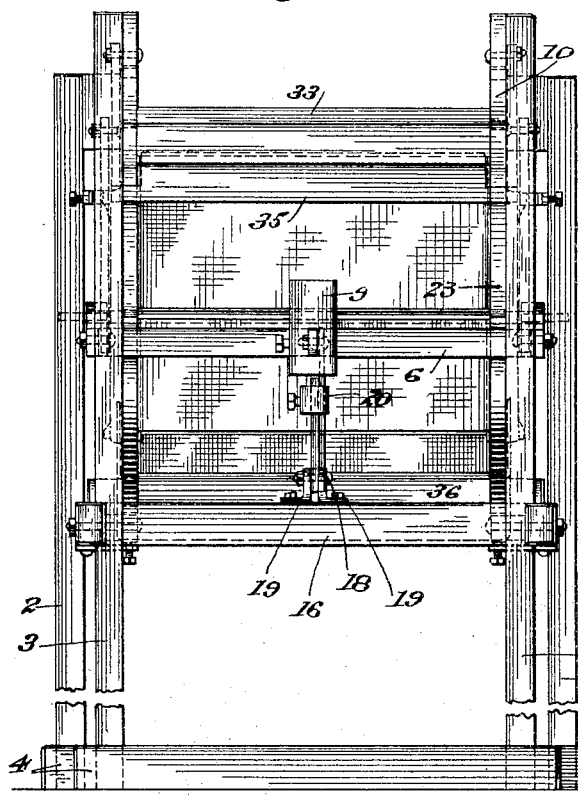
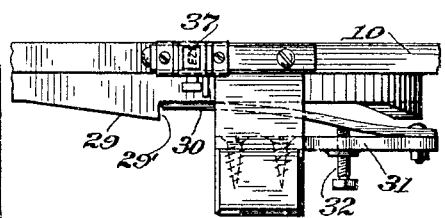
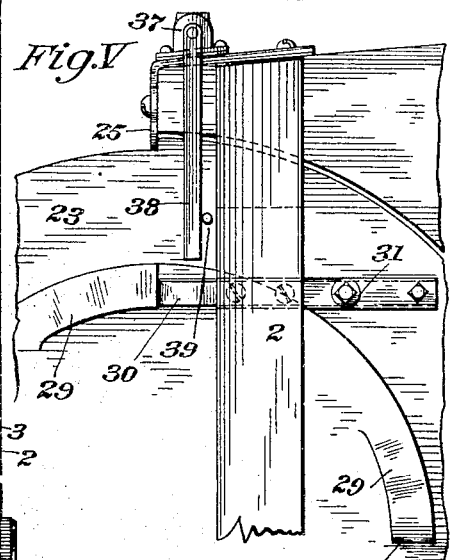
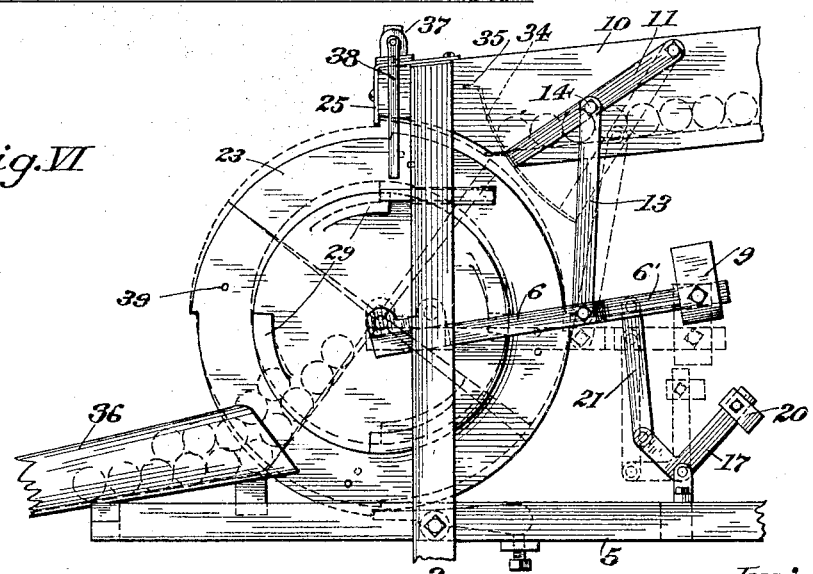
Witnesses
Geo. L. Goetz
Frederick D. Ryan
Inventor
Fred Stebler
by Townsend Bros
his Attys

UNITED STATES PATENT OFFICE.

FRED STEBLER, OF RIVERSIDE, CALIFORNIA.

AUTOMATIC WEIGHING-MACHINE.

No. 801,414. Specification of Letters Patent. Patented Oct. 10, 1905.

Application filed January 19, 1903. Serial No. 139,682.

*To all whom it may concern:*

Be it known that I, FRED STEBLER, a citizen of the United States, residing at Riverside, in the county of Riverside and State of California, have invented certain new and useful Improvements in Automatic Weighing-Machines, of which the following is a specification.

This invention relates to automatic weighing-machines, and particularly to that class of automatic weighing-machines in which the fruit or other material to be weighed or measured is delivered to a revoluble compartment-hopper which upon receiving the predetermined quantity of material automatically revolves to discharge the same into suitable receiving means.

The invention relates to such an automatic weighing-machine particularly designed for automatically weighing fruit without injury thereto by bruising or crushing the same.

The general object of the invention is to provide such an automatic weighing-machine in simple, cheap, and durable form, the action of which shall be particularly positive and efficient.

Other objects and ends will readily appear from the detail description of construction and operation.

The invention consists generally in a hopper revolubly mounted in suitable oscillating bearings, means for directing the material to be weighed into the hopper, a suitable receiving trough or part adapted to receive the weighed material, said bearings of said hopper adapted to yield vertically as the hopper receives its predetermined load, whereupon the hopper automatically revolves to the discharging-point and is thereupon automatically stopped.

The invention consists, further, in novel means for automatically stopping the revolution of the hopper to bring the respective compartments into position for receiving the fruit or other material from the feeding chute or device.

The invention consists, further, in novel means for automatically preventing backward revolution of the hopper.

The invention consists, further, in novel means for automatically stopping the hopper to bring the loaded compartment into position for discharging the fruit.

The invention consists, further, in novel means for automatically cutting off the fruit from the hopper as a compartment is loaded and when the hopper commences to revolve.

The invention consists, further, in various constructions and in general and specific combinations of parts hereinafter described, and particularly pointed out in the claims, and will be more readily understood by reference to the accompanying drawings, forming part of this specification, in which—

Figure I is a plan view of an automatic weighing-machine embodying my invention. Fig. II is a side view thereof, showing the hopper in position for receiving the fruit. Fig. III is a rear end view showing the hopper in position for receiving the fruit to be weighed. Fig. IV is a detail plan view of the brake mechanism for stopping the hopper in position to receive the fruit to be weighed and for preventing backward revolution of the hopper. Fig. V is an enlarged fragmental side elevation showing the means provided to prevent the backward revolution of the revoluble weighing-hopper and showing the actuating-arm of the registering means and its operating means. Fig. VI is a view showing the hopper in position for discharging the fruit therefrom and showing the automatic fruit cut-off in position for cutting off the supply to the hopper, the position of Fig. II being shown in dotted lines.

As shown in the drawings, 2 2 and 3 3, respectively, represent pairs of upright standards or posts forming the main frame of the machine.

4 4 represent braces by which the respective pairs of standards or posts 2 2 3 3 are secured together at their lower ends, and thereby braced and held against displacement.

5 5 represent lateral beams secured on the posts 2 3 of the sides of the frame, the forward ends thereof extending beyond the front lines of the posts 2 2 for the purpose hereinafter set forth.

An oscillating beam has forked arms 6 6, pivoted at 7 7 to the posts 2 2, the pivot-points of the arms being arranged a slight distance from the front ends of the arms 6 6, so that the fulcrums of the lever-beams 6 6 are near the bearings 8 8 of the revoluble hopper, and a counterbalance 9 is fixed upon the end 6' of the lever-beam.

10 10 represent side boards which extend between respective posts 2 3, near the tops thereof, and are preferably on the inner sides of the posts. These side boards form the sides of the feed-trough for directing the material into the revoluble hopper. Arms 11 11 are pivoted at their upper ends upon these side boards, as at 12. Approximately intermediate of these arms links 13 13 have their upper ends pivoted, as at 14, to the arms. These links have their lower ends pivoted, as at 15, upon respective arms 6 of the lever-beam.

16, Fig. III, represents a transverse beam upon which the bell-crank 17 is mounted, the bell-crank 17 being pivoted upon a pin or bolt 18, having bearings in the upper ends of the angle-piece brackets 19, secured on the beam 16, as shown. A counterbalance 20 is secured on the long arm of the bell-crank 17, and the link 21 has its lower end pivoted on the short end of the bell-crank and is pivoted on the lever-beam between the counterbalance 9 and the pivot 15 of the link 13.

22 represents the shaft of the revoluble drum or hopper and has its ends in the bearings 8 on the forward ends of the arms 6. The heads 23 of this drum are provided with a series of notches or shoulders 24, corresponding in number to the compartments of the hopper. In the drawings I have illustrated four of such shoulders and indicated the hopper as having four compartments. It is obvious any desired number of compartments may be employed. I provide stops 25 for stopping the hopper in position for receiving from the feed-trough the fruit or material to be weighed. These stops preferably consist of an angle-piece extending up the ends of the side pieces 10 and secured on the upper edges thereof.

26 represents pivoted pawls or dogs pivoted upon the inner ends of bolts 27, passing through the posts 2 and beams 5. The pawls have shoulders 26', adapted to engage the shoulders 24 on the drum-heads, as hereinafter set forth. The weighted ends 26$^a$ of the pawls are adapted to throw the shoulders 26' into engagement with the shoulders 24. The movement of the pawls 26 is regulated by the adjusting-screws 28.

I provide upon the outer faces of the heads 23 a series of lugs 29, having brake shoulders or stops 29', and provide upon the inner sides of the posts 2, near the top thereof and in the orbit of the shoulders or stops 29' on the heads, suitable means for partially retarding the forward revolution of the drums as the revolution thereof brings a given compartment into position for receiving its load and for preventing the backward revolution of the drum or hopper when the same has been revolved to bring a given compartment in such loading position. This combined friction brake and stop means comprises supports 31, mounted upon the inner sides of the posts 2 and retaining-pawls 30, preferably in the form of springs, having their rear ends secured upon the supports 31, as by means of bolts 32. In order to regulate the frictional contact of the springs 30 upon the inclined surfaces of the lugs 29, I provide set-screws 32, the outer ends of which bear against the sides of the springs 30.

Between the two side boards 10 I provide a bottom 33, suitably secured thereon, thus forming a suitable feed-trough, which is given the desired pitch or inclination. In the drawings this bottom is shown as composed of canvas, though any other preferred material may be utilized and the bottom 33 may be secured in place in any desired manner.

In order to cut off the passage of the fruit or other material from the feed-trough into the hopper when the predetermined amount thereof has passed into a given compartment, I provide automatic means whereby as the hopper or drum descends preparatory to revolving the passage of fruit from the feed-trough is stopped. This means consists of the arms 11 and their connections, as heretofore explained, and a feed-stop 34, extending between and having its ends attached to said arms. This stop 34 is adapted to pass up between the end 33' of the bottom of the trough and the hopper or drum and is preferably provided with a flange 35, adapted when said stop 34 is in the position of Fig. II to form a continuation of the bottom 33 and to direct the material into the compartment of the hopper or drum.

36 represents a suitable discharge or delivery spout suitably supported in position to receive the fruit or other material from the hopper.

37 represents a counting or registering mechanism to register the number of loads passed through the machine. This counting or registering device may be of the ordinary or any preferred construction and has an actuating-arm 38, adapted to be operated by pins or lugs 39 on the side of the drum or hopper, there preferably being a lug 39 for each compartment of the hopper.

The operation is as follows: All the compartments being empty and the counterbalances 9 and 20 having been adjusted to control the delivery of the desired weight to successive compartments, the parts of the machine will occupy the positions shown in Fig. II. It being desired to weigh oranges, the fruits are supplied to the feed-trough in any suitable manner. The fruits will roll down this trough into the compartment of the hopper. When the predetermined weight of the fruits has been delivered into the compartment, the weight thereof depresses the hopper and therewith the end of the lever 6. This depression or oscillation of the beam 6 is slow and gradual at first; but as soon as the counterbalance 20 has been moved past its center of pivot the weight of the counterbalance 20 forces down the arm 17 of the bell-crank, forcing up the lever 21, accelerating the oscillation of the lever 6. This throws the hopper down, so that the shoulder 24 is free from the stop 25, and the forcible oscillation or throw of the lever 6 accelerates the commencement of the revolution of the hopper, giving it an impetus in the revolution. During the course of the revolution of the hopper the fruits in the compartment will roll out therefrom into the discharge-spout, from whence they will be delivered to any suitable receptacle. It is thus seen that the counterbalance 20 and the bell-crank operatively connected with the lever 6 serve as means not only for accelerating the oscillation of the lever 6 and the freeing of the hopper for revolution, but serve as means to accelerate the revolution of the hopper. The bell-crank and counterbalance 20 serve also to positively and automatically operate the feed-cut-off device 34. The oscillation of the arms 6 throws up the feed-stop 34, cutting off the passage of fruit into the hopper. The downward movement of the drum forcing up the link 21 operates the bell-crank 17. It is thus seen that instantaneously with the downward movement of the drum the passage of fruit thereinto is automatically cut off and that as soon as the counterbalance 20 passes the center of the pivot of the bell-crank 17 the upward movement of the arm or link 21 is accelerated by the thrust on the weight 20. The full downward movement of the drum, the upward movement of the link 13 and feed-stop 34 is thereby insured instantaneously with the commencement of the downward movement of the drum. As soon as the weight of the oranges has been removed from the compartment the counterbalance 9 will throw down the lever-beam, raising the drum, thereby discharging the shoulder 24 from the pawl 26.

Many mechanical equivalents of constructions shown and described will readily suggest themselves to one skilled in the art. I therefore do not limit myself to the exact constructions shown, but may use any mechanical equivalents therefor.

What I claim, and desire to secure by Letters Patent of the United States, is—

1. In an automatic weighing-machine, in combination, a revoluble compartment-hopper, a feed-trough, means for holding said hopper in position to receive material therein, a pivoted lever-beam, said hopper mounted in bearings at one end thereof and adapted when loaded to tilt said beam thereby disengaging from said holding means, a counterbalance on the other end of said beam, a receiving-receptacle adapted to receive the discharged material, and auxiliary means for accelerating the tilting of said beam.

2. In an automatic weighing-machine, in combination, a revoluble compartment-hopper, a feed-trough, means for holding said hopper in position to receive material therein, a pivoted lever-beam, said hopper mounted in bearings at one end thereof and adapted when loaded to tilt said beam thereby disengaging from said holding means, a counterbalance on the other end of said beam, a receiving-receptacle adapted to receive the discharged material, means for stopping the revoluble hopper in position to discharge its load into said receiving-receptacle, and auxiliary means for accelerating the tilting of said beam.

3. In an automatic weighing-machine, in combination, a revoluble compartment-hopper, a feed-trough, means for holding said hopper in position to receive material therein, a pivoted lever-beam, said hopper mounted in bearings at one end thereof and adapted when loaded to tilt said beam thereby disengaging from said holding means, a counterbalance on the other end of said beam, a receiving-receptacle adapted to receive the discharged material, means automatically operated by the tilting of said lever-beam for cutting off the feeding material from said feed-trough, and auxiliary means for accelerating the tilting of said beam.

4. In an automatic weighing-machine, in combination, a revoluble compartment-hopper, a feed-trough, means for holding said hopper in position to receive material therein, a pivoted lever-beam, said hopper mounted in bearings at one end thereof and adapted when loaded to tilt said beam thereby disengaging from said holding means, a counterbalance on the other end of said beam, a receiving-receptacle adapted to receive the discharged material, means for stopping the revoluble hopper in position to discharge its load into said receiving-receptacle, means automatically operated by the tilting of said lever-beam for cutting off the feeding material from said feed-trough, and auxiliary means for accelerating the tilting of said beam.

5. In an automatic weighing-machine, in combination, a revoluble compartment-hopper, a feed-trough, means for holding said hopper in position to receive material therein, a pivoted lever-beam, said hopper mounted in bearings at one end thereof and adapted when loaded to tilt said beam thereby disengaging from said holding means, a counterbalance on the other end of said beam, a receiving-receptacle adapted to receive the discharged material, auxiliary means for accelerating the tilting of said beam, and means for preventing the backward revolution of said hopper.

6. In an automatic weighing-machine, in combination, a revoluble compartment-hopper, a feed-trough, means for holding said hopper in position to receive material therein, a pivoted lever-beam, said hopper mounted in bearings at one end thereof and adapted when loaded to tilt said beam thereby disengaging from said holding means, a counterbalance on the other end of said beam, a receiving-receptacle adapted to receive the discharged material, means automatically operated by the tilting of said lever-beam for cutting off the feeding material from said feed-trough, auxiliary means for accelerating the tilting of said beam, and means for preventing the backward revolution of said hopper.

7. In an automatic weighing-machine, in combination, a frame, a pivoted lever-beam, a counterbalance at one end thereof, a revoluble compartment-hopper mounted in bearings at the other, means for holding said hopper against revolution, means for feeding material into a given compartment of said hopper, said hopper adapted, upon receiving therefrom a predetermined weight of material, to tilt said beam and release said holding means, automatic means operatively connected with said beam adapted to cut off the feeding of material to said compartment, and a bell-crank operatively connected to said beam and carrying a weight, said weight adapted, upon the partial tilting of said lever-beam by said hopper, to accelerate the tilting thereof.

8. In an automatic weighing-machine, in combination, a frame, a pivoted lever-beam, a counterbalance at one end thereof, a revoluble compartment-hopper mounted in bearings at the other, means for holding said hopper against revolution, means for feeding material into a given compartment of said hopper, said hopper adapted, upon receiving therefrom a predetermined weight of material, to tilt said beam and release said holding means, automatic means operatively connected with said beam adapted to cut off the feeding of material to said compartment, a bell-crank operatively connected to said beam and carrying a weight, said weight adapted, upon the partial tilting of said lever-beam by said hopper, to accelerate the tilting thereof, discharge means, and means for stopping said hopper in position to deliver the weighted material thereto.

9. In an automatic weighing-machine, in combination, a frame, a pivoted lever-beam, a counterbalance at one end thereof, a revoluble compartment-hopper mounted in bearings at the other, means for holding said hopper against revolution, means for feeding material into a given compartment of said hopper, said hopper adapted, upon receiving therefrom a predetermined weight of material, to tilt said beam and release said holding means, automatic means operatively connected with said beam adapted to cut off the feeding of material to said compartment, a bell-crank operatively connected to said beam and carrying a weight, said weight adapted, upon the partial tilting of said lever-beam by said hopper, to accelerate the tilting thereof, and means for preventing the backward revolution of said hopper.

10. In an automatic weighing-machine, in combination, a frame, a pivoted lever-beam, a counterbalance at one end thereof, a revoluble compartment-hopper mounted in bearings at the other, means for holding said hopper against revolution, means for feeding material into a given compartment of said hopper, said hopper adapted, upon receiving therefrom a predetermined weight of material, to tilt said beam and release said holding means, automatic means operatively connected with said beam adapted to cut off the feeding of material to said compartment, a bell-crank operatively connected to said beam and carrying a weight, said weight adapted, upon the partial tilting of said lever-beam by said hopper, to accelerate the tilting thereof, discharge means, means for stopping said hopper in position to deliver the weighted material thereto, and means for preventing the backward revolution of said hopper.

11. In an automatic weighing-machine, in combination, a pivoted lever-beam, a revoluble compartment-hopper mounted in bearings at one end thereof, a counterbalance at the other end, a feed-trough, a pivoted feed cut-off operatively connected with said lever-beam, a discharge-spout, means for holding said hopper against revolution until a predetermined weight of material has been delivered into a compartment thereof and a pivoted weight device operatively connected with said lever-beam and adapted to accelerate the movement of said beam.

12. In an automatic weighing-machine, in combination, a pivoted lever-beam, a revoluble compartment-hopper mounted in bearings at one end thereof, a counterbalance at the other end, a feed-trough, a pivoted feed cut-off operatively connected with said lever-beam, a discharge-spout, means for holding said hopper against revolution until a predetermined weight of material has been delivered into a compartment thereof, and a bell-crank operatively connected with said lever-beam and carrying a weight adapted to accelerate the oscillation of said beam.

13. In an automatic weighing-machine, in combination, a pivoted lever-beam, a revoluble compartment-hopper mounted in bearings at one end thereof, a counterbalance at the other end, a feed-trough, a discharge-spout, means for holding said hopper against revolution until a predetermined weight of material has been delivered into a compartment thereof, means for stopping said hopper in position to discharge the load from said compartment and a pivoted weight device operatively connected with said lever-beam normally in position with the weight of said device over the pivot as not to affect the initial action of the counterbalanced lever-beam, but when moved from normal position to accelerate the movement of the lever-beam.

14. In an automatic weighing-machine, in combination, a pivoted lever-beam, a revoluble compartment-hopper mounted in bearings at one end thereof, a counterbalance at the other end, a feed-trough, a pivoted feed cut-off operatively connected with said lever-beam, a discharge-spout, means for holding said hopper against revolution until a predetermined weight of material has been delivered into a compartment thereof, a bell-crank operatively connected with said lever-beam and carrying a weight adapted to accelerate the oscillation of said beam, and means for stopping said hopper in position to discharge the load from said compartment.

15. In an automatic weighing-machine, in combination, a pivoted lever-beam, a revoluble compartment-hopper mounted in bearings at one end thereof, a counterbalance at the other end, a feed-trough, a pivoted feed cut-off operatively connected with said lever-beam, a discharge-spout, means for holding said hopper against revolution until a predetermined weight of material has been delivered into a compartment thereof, a bell-crank operatively connected with said lever-beam and carrying a weight adapted to accelerate the oscillation of said beam, and means for preventing the backward revolution of said hopper.

16. In an automatic weighing-machine, in combination, a pivoted lever-beam, a counterbalance at one end thereof, a revoluble compartment-hopper mounted in bearings at the other and provided with a series of notches or shoulders, a feed-trough, a stationary stop and a pivoted stop, and a discharge trough or receptacle, said stationary stop arranged to engage one of said notches or shoulders when said hopper is tilted into position for loading, and said pivoted stop provided with means pressing it toward the notched part of the hopper and with stop means, and arranged to engage one of said notches when said hopper revolves to a position to discharge its load.

17. In an automatic weighing-machine, in combination, a pivoted lever-beam, a counterbalance at one end thereof, a revoluble compartment-hopper mounted in bearings at the other and provided with a series of notches or shoulders, a feed-trough, a stationary stop and a pivoted stop, and a discharge trough or receptacle, said stationary stop arranged to engage one of said notches or shoulders when said hopper is tilted into position for loading, said pivoted stop arranged to engage one of said notches when said hopper revolves to a position to discharge its load, said hopper provided on its head with a series of lugs and a friction-brake and retainer operating in connection therewith.

18. An automatic weighing-machine, comprising a revoluble hopper with lugs having inclined faces and stop-faces, a pivoted lever-beam, said hopper having bearings at one end of said beam, a counterbalance at the other end, said beam having its fulcrum between said hopper-bearings and said counterbalance, and a stationary pawl device coöperating with said lugs to serve as a friction-brake in connection with said hopper and to prevent back movement of the hopper.

19. In an automatic weighing-machine, in combination, a frame, a revoluble compartment hopper or drum, a lever-beam upon one end of which said hopper has its bearings, a counterbalance at the other end of said lever-beam, said lever-beam pivoted to said frame and having its fulcrum between the bearings of said hopper and said counterbalance, a feed-trough, a discharge spout or trough, a series of shoulders upon said hopper, stationary means on said frame adapted to operate against one of said shoulders to hold the hopper from revolving as said drum assumes a position with a compartment in position for filling, and pivoted means arranged upon the frame in the orbit of said shoulders and adapted to stop said drum in position for discharging into said discharge spout or hopper when released from said stationary means.

20. In an automatic weighing-machine, in combination, a frame, a revoluble compartment-hopper, a lever-beam upon one end of which said hopper has its bearings, a counterbalance at the other end thereof, said lever-beam having its fulcrum between said hopper-bearings and said counterbalance, a feed-trough, a discharge-trough, a series of shoulders upon said hopper, stationary means on said frame arranged to operate against one of said shoulders to hold the hopper from revolving when said hopper is in its raised position, pivoted means in the orbit of said shoulders arranged to stop said hopper in position for discharging, and lugs or projections on said hopper, and a friction-brake and retainer on said frame adapted to coöperate therewith.

21. An automatic weighing-machine comprising, in combination, a frame, a lever-beam pivoted intermediate its ends in said frame, a revoluble compartment-hopper mounted in one end of said beam, a counterbalance operatively connected with the other end of said beam, a feed-trough arranged above said hopper to discharge therein, a feed-stop pivotally mounted on said feed-trough and operating through the bottom of said trough, a link connection between said feed-stop and said beam, and means for stopping said hopper in position for successively loading the compartments of said hopper.

22. An automatic weighing-machine comprising, in combination, a frame, a lever-beam pivoted intermediate its ends in said frame, a revoluble compartment-hopper mounted in one end of said beam, a counterbalance at the other end of said beam, a feed-trough arranged above said hopper to discharge therein, a feed-stop, an arm pivotally connecting said feed-stop to said feed-trough, said feed-stop operating through the bottom of said trough, a link having one of its ends pivoted on said arm and its other end pivoted to said beam, and means for stopping said hopper in position for successively loading the compartments of said hopper from said feed-trough.

23. An automatic weighing-machine comprising in combination a frame, a lever-beam pivoted in said frame intermediate its length, a revoluble compartment-hopper having its bearings at one end of said beam, a counterbalance in connection with said beam at the opposite side of the pivot thereto, a feed-trough, a discharge-trough, means operating through said feed-trough to cut off the feed of material into said hopper, said means operatively connected with said lever-beam, said hopper provided with lugs having inclined faces and stop-faces, a stationary pawl device coöperating with said lugs to serve as a friction-brake in connection with said hopper and to prevent back movement of said hopper, and means for stopping said hopper in position to receive the material to be weighed from said feed-trough and in position to discharge into said discharge-trough.

24. An automatic weighing-machine comprising in combination a frame, a lever-beam pivoted in said frame intermediate its length, a revoluble hopper having bearings toward one end of said lever-beam, a counterbalance connected with said lever-beam toward the other end thereof, a feed-trough, a discharge-trough, means automatically operated by said beam to cut off the feed of material into said hopper, said hopper provided with a series of shoulders, a stationary stop and a pivoted stop, said stationary stop arranged to engage one of said shoulders when said hopper is operated into position for loading, and said pivoted stop provided with means throwing it toward the shoulder of the hopper, and with stop means, and arranged to engage one of said shoulders, when said hopper revolves to a position to discharge its load.

In testimony whereof I have signed my name to this specification, in the presence of two subscribing witnesses, at Riverside, in the county of Riverside and State of California, this 13th day of January, 1903.

FRED STEBLER.

Witnesses:
H. B. HEDGER,
WM. STUDABECKER.